United States Patent
Lim et al.

(10) Patent No.: US 10,034,317 B2
(45) Date of Patent: Jul. 24, 2018

(54) METHOD FOR ALLOWING BASE STATION TO SUPPORT DEVICE-TO-DEVICE (D2D) COMMUNICATION IN WIRELESS COMMUNICATION SYSTEM, AND METHOD FOR ALLOWING D2D DEVICE TO EFFICIENTLY TRANSMIT D2D COMMUNICATION REQUEST SIGNAL

(71) Applicant: LG ELECTRONICS INC., Seoul (KR)

(72) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 14/353,458

(22) PCT Filed: Oct. 24, 2012

(86) PCT No.: PCT/KR2012/008762
§ 371 (c)(1),
(2) Date: Apr. 22, 2014

(87) PCT Pub. No.: WO2013/062310
PCT Pub. Date: May 2, 2013

(65) Prior Publication Data
US 2014/0286284 A1    Sep. 25, 2014

Related U.S. Application Data

(60) Provisional application No. 61/550,458, filed on Oct. 24, 2011.

(51) Int. Cl.
*H04W 76/02* (2009.01)
*H04L 5/00* (2006.01)
(Continued)

(52) U.S. Cl.
CPC .......... *H04W 76/023* (2013.01); *H04L 5/003* (2013.01); *H04W 76/14* (2018.02); *H04W 8/005* (2013.01); *H04W 72/121* (2013.01)

(58) Field of Classification Search
CPC ............................ H04W 76/023; H04L 5/003
See application file for complete search history.

(56) References Cited

U.S. PATENT DOCUMENTS

| 8,761,099 | B2* | 6/2014 | Charbit | H04W 72/04 370/329 |
| 2011/0106952 | A1* | 5/2011 | Doppler | H04W 72/0406 709/226 |

(Continued)

FOREIGN PATENT DOCUMENTS

| CN | 101940052 | 1/2011 |
| CN | 102090132 | 6/2011 |

(Continued)

OTHER PUBLICATIONS

Doppler, et al., "Innovative concepts in Peer-to-Peer and Network Coding", Jan. 2009, 25 pages.
(Continued)

*Primary Examiner* — Yemane Mesfin
*Assistant Examiner* — Henry Baron
(74) *Attorney, Agent, or Firm* — Lee Hong Degerman Kang Waimey

(57) ABSTRACT

Method for supporting device-to-device (D2D) communication by a base station includes: receiving first signals for requesting D2D communication from a plurality of first D2D devices; identifying number of D2D devices which have requested the D2D communication based upon the first signals; allocating resources for transmitting a second signal for requesting D2D communication between the D2D devices based upon number of the plurality of first D2D devices which have been identified; and transmitting infor- (Continued)

mation on the allocated resources to the plurality of first D2D devices, wherein the resource allocation can be performed to distinguish combinations of an index of a D2D device, which transmits the second signal, and an index of a D2D device, which receives the second signal, from each other with respect to at least one of time, frequency, code, and space domains with respect to the plurality of first D2D devices.

8 Claims, 9 Drawing Sheets

(51) Int. Cl.
*H04W 8/00* (2009.01)
*H04W 76/14* (2018.01)
*H04W 72/12* (2009.01)

(56) References Cited

U.S. PATENT DOCUMENTS

| | | | | |
|---|---|---|---|---|
| 2011/0199997 | A1* | 8/2011 | Wennstrom | H04L 1/1607 370/329 |
| 2012/0129540 | A1* | 5/2012 | Hakola | H04W 72/042 455/450 |
| 2013/0059583 | A1* | 3/2013 | Van Phan | H04W 72/04 455/435.1 |
| 2013/0225191 | A1* | 8/2013 | Hunt | H04L 5/0041 455/452.1 |
| 2015/0063095 | A1* | 3/2015 | Deng | H04W 8/005 370/221 |

FOREIGN PATENT DOCUMENTS

| | | |
|---|---|---|
| WO | 2008149420 | 12/2008 |
| WO | 2010082084 | 7/2010 |
| WO | 2010109303 | 9/2010 |
| WO | 2011088609 | 7/2011 |
| WO | 2011121374 | 10/2011 |

OTHER PUBLICATIONS

Janis, et al., "Interference-aware resource allocation for device-to-device radio underlaying cellular networks", IEEE, Apr. 2009, 5 pages.
PCT International Application No. PCT/KR2012/008762, Written Opinion of the International Searching Authority dated Feb. 14, 2013, 11 pages.
State Intellectual Property Office of the People's Republic of China Application Serial No. 201280063525.9, Office Action dated May 27, 2016, 17 pages.

* cited by examiner

METHOD FOR ALLOWING BASE STATION TO SUPPORT DEVICE-TO-DEVICE (D2D) COMMUNICATION IN WIRELESS COMMUNICATION SYSTEM, AND METHOD FOR ALLOWING D2D DEVICE TO EFFICIENTLY TRANSMIT D2D COMMUNICATION REQUEST SIGNAL

CROSS-REFERENCE TO RELATED APPLICATIONS

This application is the National Stage filing under 35 U.S.C. 371 of International Application No. PCT/KR2012/008762, filed on Oct. 24, 2012, which claims the benefit of U.S. Provisional Application Ser. No. 61/550,458, filed on Oct. 24, 2011, the contents of which are all hereby incorporated by reference herein in their entirety.

TECHNICAL FIELD

The present invention relates to wireless communication and, more particularly, to a method for allowing a base station to support device-to-device (D2D) communication in a wireless communication system and a method for allowing a D2D device to efficiently transmit a D2D communication request signal.

BACKGROUND ART

With recent spread of smartphones and tablet PCs and activation of large-capacity multimedia communication, mobile traffic abruptly increases. Mobile traffic increase is expected to double every year. Since most mobile traffic is transmitted through base stations, common carriers are facing serious network load problems. Accordingly, common carriers increase network installation in order to process increasing traffic and commercialize next-generation mobile telecommunication standards for efficiently processing a large amount of traffic, such as mobile WiMAX, LTE (Long Term Evolution), etc. However, other solutions are needed to handle rapidly increasing traffic.

Device-to-device (D2D) communication is a distributed communication technology for directly transmitting traffic between neighboring nodes without using infrastructure such as base stations. In a D2D communication environment, each node such as a terminal finds another terminal physically adjacent thereto, establishes a communication session and then transmits traffic to the other terminal. Since D2D communication can solve traffic overload by distributing traffic concentrated on a base station, it is in the spotlight as a technical element of a next-generation mobile telecommunication following 4G. For this reason, standardization organizations such as 3GPP, IEEE, etc. are promoting D2D communication standards establishment on the basis of LTE-A or Wi-Fi and telecommunication companies such as Qualcomm, etc. are developing independent D2D communication technologies.

D2D communication is expected to improve mobile communication system performance and to create new communication services. Furthermore, D2D communication can support proximity based social network services, network games, etc. Connectivity problems of terminals in shadow areas may be solved using a D2D link as a relay. In this manner, D2D technology is expected to provide new services in various applications.

In reality, machine-to-machine communication schemes such as infrared communication, ZigBee, RFID (radio frequency identification) and NFC (near field communications) based thereon have been widely used. However, these technologies only support communication for special purposes within a very limited distance (1 m or less), and thus it is difficult to categorize the same as D2D communication schemes.

While the concept of D2D communication has been discussed, a method for preventing resource collision with legacy terminals and efficiently allocating resources for discovery signals between D2D devices and a D2D communication request signal has not been studied.

DISCLOSURE

Technical Problem

An object of the present invention devised to solve the problem lies in a method for allowing a base station to support D2D communication in a wireless communication system.

Another object of the present invention is to provide a method for allowing a D2D device to transmit a signal in a wireless communication system.

Still another object of the present invention is to provide a base station supporting D2D communication in a wireless communication system.

Yet another object of the present invention is to provide a D2D device transmitting a D2D signal in a wireless communication system.

The technical problems solved by the present invention are not limited to the above technical problems and those skilled in the art may understand other technical problems from the following description.

Technical Solution

The object of the present invention can be achieved by providing a method for supporting device-to-device (D2D) communication by a base station (BS) in a wireless communication system, the method including: receiving first signals for requesting D2D communication from a plurality of first D2D devices; obtaining number of first D2D devices for requesting D2D communication based upon the first signals; allocating resources for transmitting a second signal requesting D2D communication between D2D devices based upon the obtained number of first D2D devices; and transmitting information on the allocated resources to the plurality of first D2D devices which have transmitted the first signals, wherein the resources are allocated such that the resources are discriminated for combinations of an index of a D2D device which transmits the second signal and an index of a D2D device which receives the second signal in at least one of time, frequency, code, and spatial domains, with respect to the plurality of first D2D devices which have transmitted the first signals. The information on the allocated resources may include at least one of information on the obtained number of first D2D devices and information on a mapping rule with respect to identifiers of the plurality of first D2D devices which have transmitted the first signals and the number of first D2D devices. The method may further include transmitting information on a transmission interval in which the first signals are transmitted to the plurality of first D2D devices, wherein the first signals are received in a first transmission interval included in the information on the transmission interval.

The method may further include: receiving the first signals from a plurality of second D2D devices in a second transmission interval; obtaining the number of the plurality of second D2D devices based upon the first signals received in the second transmission interval; and reallocating resources for transmitting the second signal based upon the obtained number of the second D2D devices.

The method may further include grouping the plurality of first D2D devices into a plurality of groups, wherein the resources for transmitting the second signal are allocated per group based upon the obtained number of the first D2D devices, and information on the allocated resources is transmitted to each group. The resources allocated per group may be discriminated in at least one of time, frequency, code and spatial domains, or the resources may be allocated such that the resources are discriminated for combinations of an index of a D2D device which transmits the second signal and an index of a D2D device which receives the second signal in at least one of time, frequency, code, and spatial domains. The method may further include transmitting information on number of groups obtained by grouping the plurality of first D2D devices.

The information on the allocated resources may be transmitted through a broadcast channel or a control channel.

In another aspect of the present invention, provided herein is a method for transmitting a signal by a device-to-device (D2D) device in a wireless communication system, the method including: transmitting a first signal for requesting D2D communication to a BS; receiving, from the BS, information on resources allocated to transmit a second signal for requesting D2D communication between D2D devices; and transmitting the second signal to at least another D2D device through the allocated resources, wherein the resources are allocated based upon number of D2D devices requesting D2D communication according to the first signal, wherein the resources are allocated such that the resources are discriminated for combinations of an index of the D2D device which transmits the first signal and an index of the at least one D2D device which receives the second signal in at least one of time, frequency, code, and spatial domains, with respect to the plurality of first D2D devices which have transmitted the first signals. The index of the D2D device which transmits the first signal and the index of the at least one D2D device which receives the second signal may correspond to one of a station identifier (STID), a cell-radio network temporary identifier (C-RNTI), a D2D dedicated ID, a peer discovery ID set through peer discovery and a D2D logical number allocated by a BS. The combinations of the index of the D2D device which transmits the first signal and the index of the at least one D2D device which receives the second signal may be allocated and discriminated on a symbol basis in the time domain and a subcarrier or carrier basis in the frequency domain.

In another aspect of the present invention, provided herein is a base station of supporting D2D communication in a wireless communication system, including: a receiver configured to receive first signals for requesting D2D communication from a plurality of first D2D devices; a processor configured to obtain number of first D2D devices requesting D2D communication based upon the first signals and to allocate resources for transmitting a second signal requesting D2D communication between D2D devices based upon the obtained number of first D2D devices; and a transmitter configured to transmit information on the allocated resources to the plurality of first D2D devices which have transmitted the first signals, wherein resource allocation by the processor is performed such that the resources are discriminated for combinations of an index of a D2D device which transmits the second signal and an index of a D2D device which receives the second signal in at least one of time, frequency, code, and spatial domains, with respect to the plurality of first D2D devices which have transmitted the first signals.

In another aspect of the present invention, provided herein is a device-to-device (D2D) device for transmitting a signal in a wireless communication system, including: a transmitter configured to transmit a first signal for requesting D2D communication to a BS; a receiver configured to receive, from the BS, information on resources allocated to transmit a second signal for requesting D2D communication between D2D devices; and a processor configured to control the D2D device to transmit the second signal to at least another D2D device through the allocated resources, wherein the resources are allocated based upon number of D2D devices requesting D2D communication according to the first signal, wherein the resources are allocated such that the resources are discriminated for combinations of an index of the D2D device which transmits the first signal and an index of the at least one D2D device which receives the second signal in at least one of time, frequency, code, and spatial domains, with respect to the plurality of first D2D devices which have transmitted the first signals.

Advantageous Effects

According to embodiments of the present invention, regions for a discovery signal between D2D devices and a D2D communication request signal can be efficiently allocated so as to efficiently use resources.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
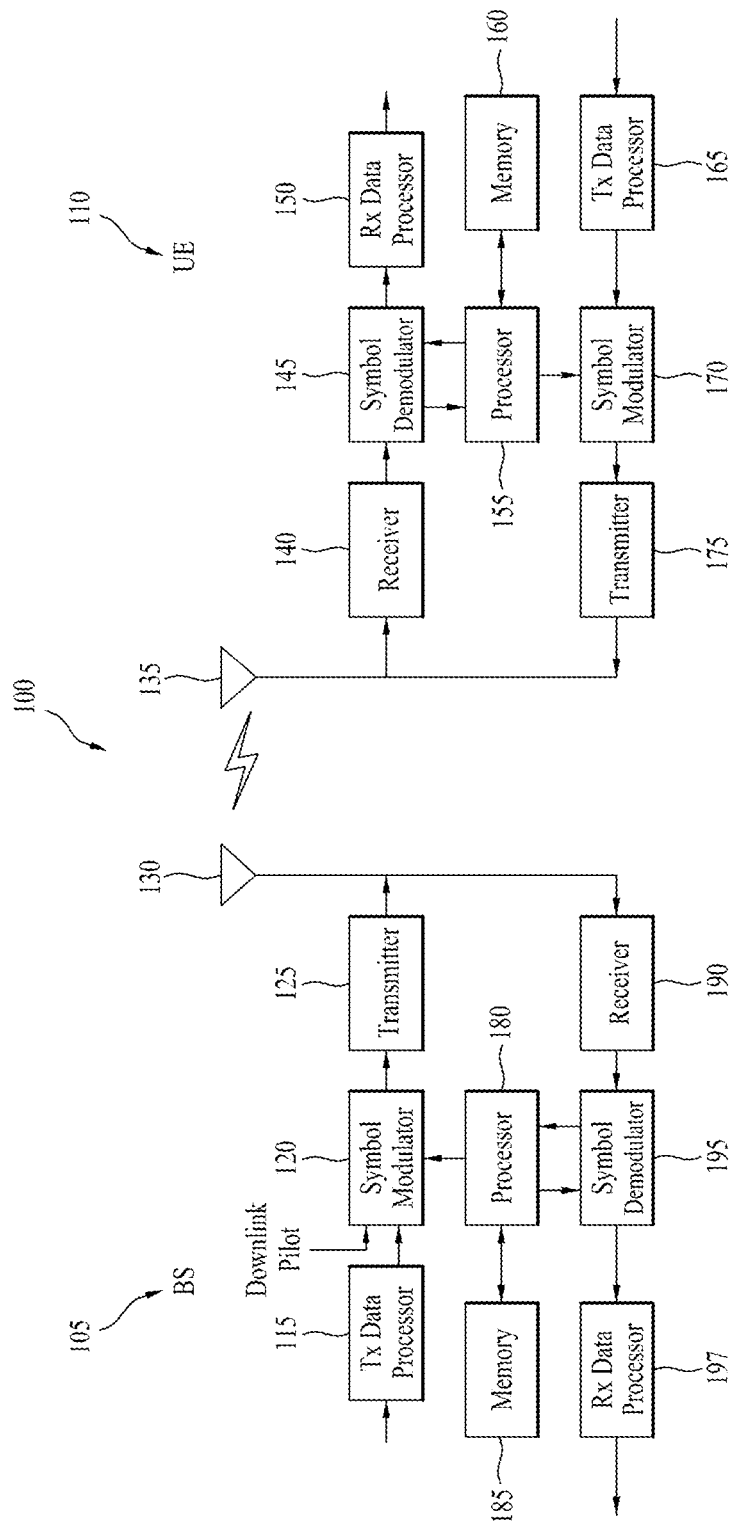
FIG. 1 illustrates configurations of a base station (BS) 105 and a user equipment (UE) 110 in a wireless communication system 100.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE and LTE-A mobile communication systems are used. However, the description is applicable to any other mobile communication system except for specific features inherent to the 3GPP LTE and LTE-A systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term 'base station (BS)' is assumed to refer to any node of a network end, such as a Node B, eNode B, an access point (AP), etc., communicating with a UE. While the specification is based on IEEE 802.16, the present invention is applicable to other communication systems.

In a mobile communication system, a UE may receive information from a BS on a downlink and transmit information to the BS on uplink. The information that the UE transmits or receives includes data and various types of control information. There are many physical channels according to the types and usages of information that the UE transmits or receives.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

It should be noted that specific terms disclosed in the present invention are proposed for convenience of description and better understanding of the present invention, and the use of these specific terms may be changed to other formats within the technical scope or spirit of the present invention.

FIG. 1 is a block diagram illustrating configurations of a BS 105 and a UE 110 in a wireless communication system 100.

While one BS 105 and one UE 110 are shown in FIG. 1 to simplify the configuration of the wireless communication system 100, the wireless communication system 100 may obviously include one or more BSs and/or one or more UEs.

Referring to FIG. 1, the BS 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, the BS 105 and the UE 110 include multiple antennas. Hence, the BS 105 and the UE 110 support MIMO (Multiple Input Multiple Output). Furthermore, the BS 105 may support both single user-MIMO (SU-MIMO) and multi-user-MIMO (MU-MIMO) in the present invention.

On downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the BS 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the BS 105 through the antenna 135.

The BS 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured as hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180.

When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a wireless communication system (network) may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the network exchange RRC messages through the RRC layer.

"D2D device" which will be described below refers to a UE capable of supporting D2D communication in a wireless communication system (or cellular network) such as 3GPP LTE, LTE-A, IEEE 802, etc. A UE located in a cell in a cellular network can access a BS to receive information necessary to transmit/receive data to/from the BS and then transmit/receive data to/from the BS for D2D communication. That is, since the UE transmits/receives data through the BS, the UE transmit data to another UE in such a manner that the UE transmits the data to the BS and then the BS delivers the data to the other UE. Since one UE can transmit data to another UE only through the BS, the BS needs to schedule channels and resources for data transmission and reception and to transmit scheduling information to each UE.

While allocation of channels and resources through which data is transmitted to/received from the BS is needed to perform communication between UEs via the BS, D2D communication allows a UE to directly transmit/receive signals to/from a desired UE without a BS or a relay. Accordingly, channel and resource structures need to be designed such that signals can be transmitted and received without control of the BS for D2D communication. Here, a method for avoiding channel and resource allocation collision with legacy cellular UEs is needed for operations in a cellular network.

A D2D device which performs D2D communication needs to carry out D2D peer discovery in order to check presence of neighboring D2D devices to/from which the D2D device can transmit/receive data prior to transmission to another D2D device through D2D communication. D2D peer discovery can be performed within a discovery interval in a frame structure and the discovery interval is shared by all D2D devices. The D2D device can monitor logical channels of a discovery region within the discovery interval to receive discovery signals transmitted from other D2D devices. Upon reception of the discovery signals, the D2D device creates a list of neighboring D2D devices using the received signals. In addition, the D2D device selects channels or resources which are not used by the other D2D devices as discovery channels or resources in the discovery interval and broadcasts a discovery signal, (e.g. information thereof (i.e. an identifier)) through the discovery channels or resources. Then, the other D2D devices can recognize that the D2D device is located within a range within which the D2D device can perform D2D communication by receiving the broadcast discovery signal.

The D2D device for D2D communication can detect neighboring D2D devices by performing discovery and generate a list of the neighboring D2D devices. The D2D device sets a device with which the D2D device will communicate from among the D2D devices corresponding to the list and transmits a D2D communication request signal to the corresponding device so as to settle D2D operation. In this case, it is necessary to design a method for setting a channel structure or a resource region for transmitting the D2D communication request signal.

The present invention proposes a method for allocating (or generating) a channel through which a D2D device within a cell transmits a D2D communication request signal to another D2D device after discovery in order to perform D2D communication. The channel for transmission and reception of the D2D communication request signal between D2D devices can be configured on the basis of the number of D2D devices through various methods. A description will be given of methods for transmitting the D2D communication request signal (which may be referred to as a request signal) for D2D communication after peer discovery.

Embodiment 1: Method for Configuring a D2D Communication Request Signal Transmission/Reception Region Using a Maximum Number of Supportable D2D Devices In general, the number of D2D devices supportable by a BS is fixed. Accordingly, when the maximum number of D2D devices which can access or register with the BS within the corresponding cell, that is, which can be supported by the BS is K, the BS configures a region in which D2D communication request signals can be transmitted in consideration of a case in which the K D2D devices perform D2D communication. Here, K may be the maximum number of peer discovery D2D devices. In this case, each of the K D2D devices can transmit the D2D communication request signal to the remaining K−1 D2D devices and a reception D2D device can receive the D2D communication request signal from other K−1 D2D devices. Accordingly, the BS can allocate K×K resources (precisely, K×(K−1) resources except for a resource with respect to a D2D device which transmits/receives the D2D communication request signal to/from itself) for transmitting and receiving the D2D communication request signals of the D2D devices.

A D2D device can receive information about a region allocated for transmission and reception of D2D communication request signals from the BS and transmit the D2D communication request signal to a D2D device which desires D2D communication through the allocated region. Upon detection of the D2D communication request signal by monitoring the allocated region, the corresponding reception D2D device can recognize the D2D device which has transmitted the D2D communication request signal through a position in which the D2D communication request signal is transmitted.

Figure 2:
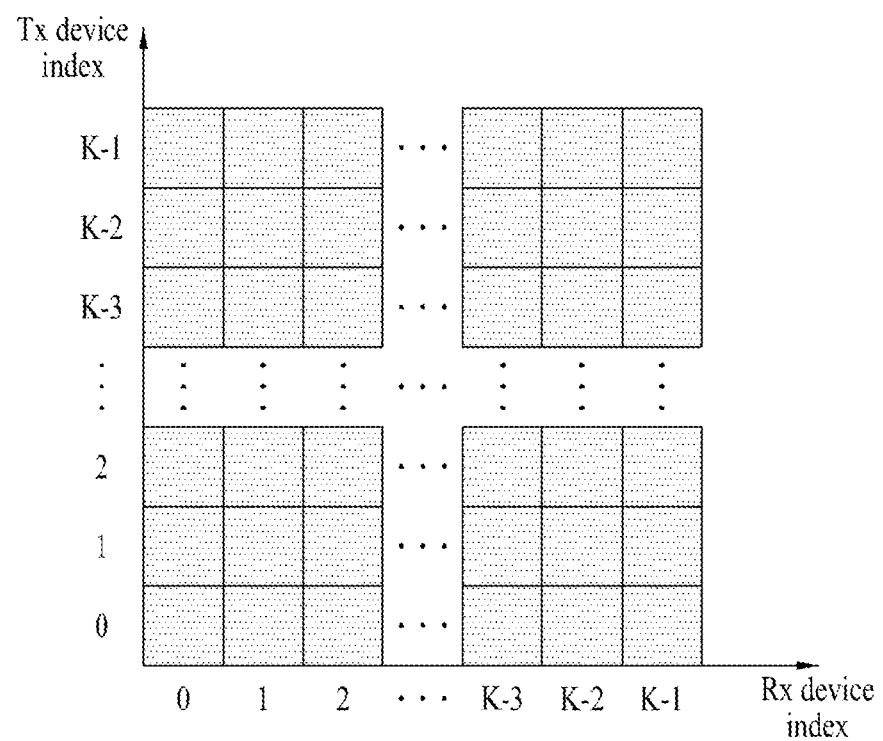
FIG. 2 illustrates an exemplary resource configuration for transmitting a D2D communication request signal for requesting D2D communication according to a first embodiment of the present invention.

FIG. 2 illustrates an exemplary resource configuration for transmitting the D2D communication request signal for requesting D2D communication according to the first embodiment of the present invention.

A resource region for transmitting the D2D communication request signal may be configured per transmission D2D device index (Tx device index) and per reception D2D device index (Rx device index), as shown in FIG. 2. In FIG. 2, the horizontal axis represents the time domain and the vertical axis represents the frequency domain. The Tx or Rx device index may be represented in various forms such as an STID (station identifier) of a D2D device, a C-RNTI (cell-radio network temporary identifier), a D2D dedicated ID, a peer discovery ID set through peer discovery, a D2D logical number allocated by a BS, etc. The region for transmitting the D2D communication request signal may be mapped to carriers (or subcarriers) or symbols and the Tx or Rx device index may correspond to a single subcarrier (symbol) or multiple subcarriers (or symbols).

While the horizontal axis represents the time domain and the vertical axis represents the frequency domain in FIG. 2, the horizontal axis may represent the frequency domain and the vertical axis may represent the time domain. Furthermore, a code domain or a spatial domain may be included in a resource configuration and multiple domains may be connected in a hybrid manner. The following description is based on the time domain and the frequency domain for convenience.

When the number of subcarriers (or carriers) used in a system is less than the number of D2D devices supported by the BS in the frequency domain, the BS may extend the region for transmitting D2D communication request signals of D2D devices to the time domain. If the BS supports the aforementioned K D2D devices, then the region for transmitting D2D communication request signals can be configured as shown in FIG. 3.

Figure 3:
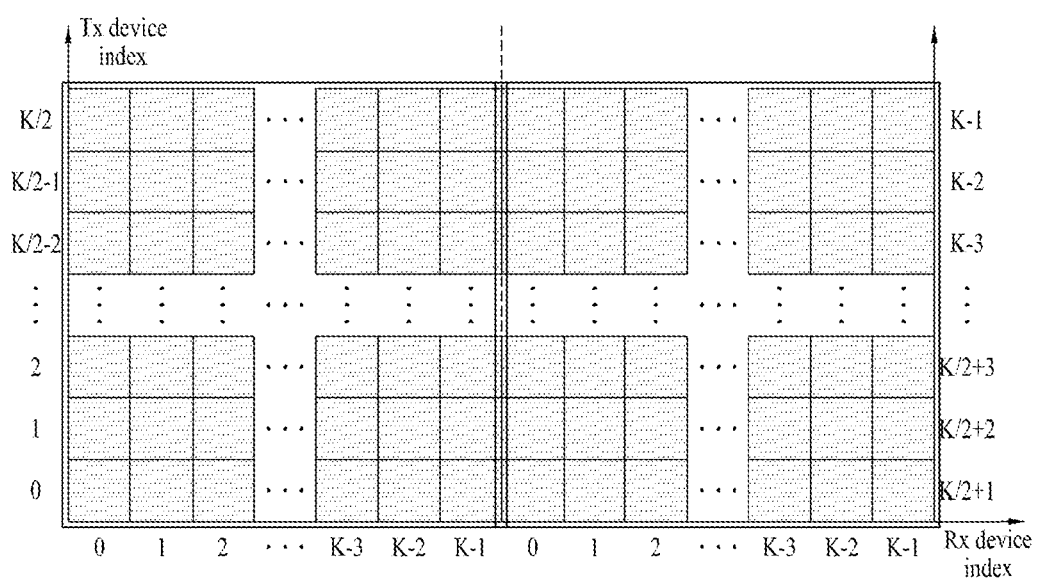
FIG. 3 illustrates an example of extending regions for transmitting a D2D communication signal to the time domain according to the first embodiment of the present invention.

FIG. 3 illustrates an example of extending a region for transmitting D2D communication signals to the time domain according to the first embodiment of the present invention.

Information about the structure of a resource region for transmission and reception of D2D communication request signals may be broadcast by the BS to D2D devices within the corresponding cell through a broadcast signal or transmitted to the D2D devices through higher layer signaling. The BS may transmit, to D2D devices, information about allocation of resources for transmitting and receiving D2D communication request signals through a broadcast channel (e.g. physical broadcast channel (PBCH)) or a control channel (e.g. physical downlink control channel (PDCCH)). Here, the information about resource allocation for transmitting D2D communication request signals may include at least one of position information of the allocated resource, allocation period information, size information of the allocated resource, and information about mapping of the allocated resource and the identifier of the D2D device corresponding to the allocated resource, etc.

When resources are allocated using the maximum number K of D2D devices supportable by the BS, resource efficiency decreases since the BS needs to reserve resources for supporting the maximum numbers of D2D devices all the time irrespective of the number of D2D devices actually connected to the BS. However, once a resource configuration is set, the configuration is used without modification and thus additional signaling for indicating the configuration or a configuration change is not needed.

Figure 4:
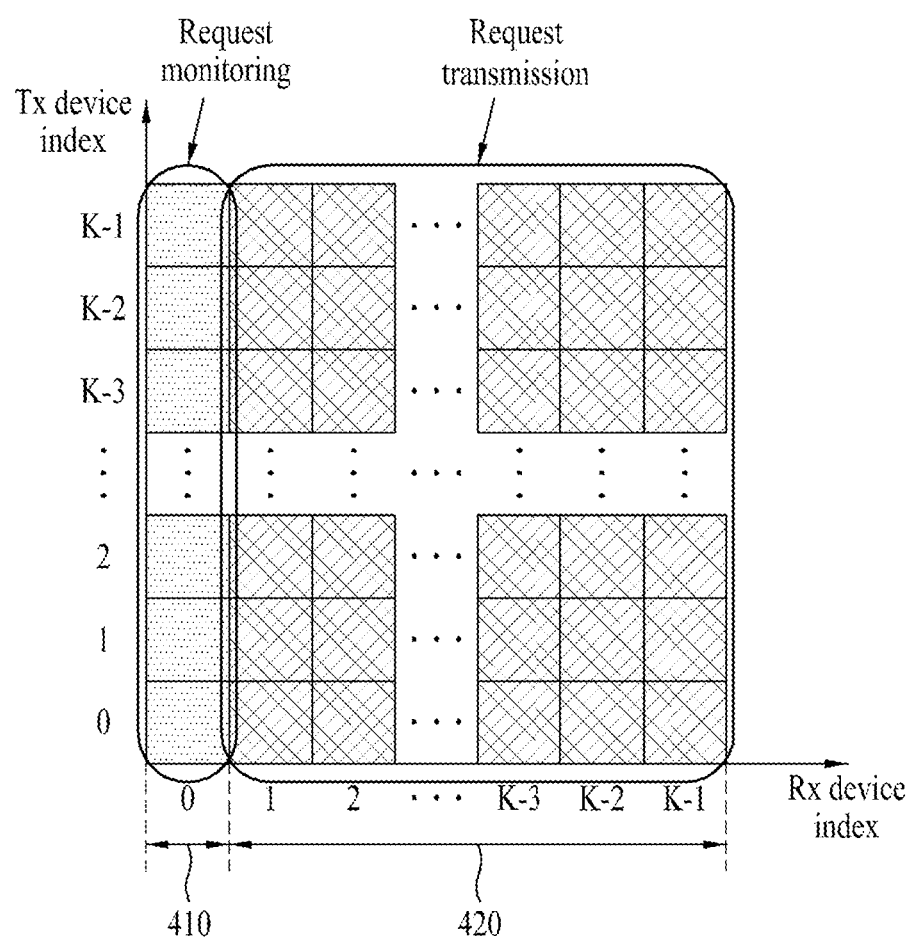
FIG. 4 illustrates an exemplary resource configuration for transmitting a D2D communication request signal for requesting D2D communication according to the first embodiment of the present invention.

FIG. 4 illustrates an exemplary resource configuration for transmitting the D2D communication request signal for requesting D2D communication according to the first embodiment of the present invention.

To decrease decoding complexity and power consumption of a D2D device which receives the D2D communication request signal, a resource 410 through which each Rx D2D device checks whether there is a D2D device which requests D2D communication thereto may be allocated per Rx D2D device. That is, each Rx D2D device checks a dedicated resource allocated thereto and, upon determining that a D2D communication request signal transmitted thereto is present, checks the resource 410 reserved for transmission of the D2D communication request signal between the Rx D2D device and other D2D devices in order to detect a D2D device which has transmitted the D2D communication request signal. If the Rx D2D device determines that the D2D communication request signal is not present, then the Rx D2D device can omit operations of checking the remaining K−1 resources 420. Accordingly, power consumption and decoding complexity of the D2D device can be reduced.

A Tx D2D device which transmits the D2D communication request signal may transmit the D2D communication request signal even through the resource 410 reserved for the corresponding Rx D2D device in addition to a resource dedicated for transmission of the Tx D2D device and the Rx D2D device. Considering the case of K×K (here, the number of Tx D2D devices may differ from the number or Rx D2D devices), as shown in FIG. 4, a resource (k, k) (k=0, . . . , K−1) reserved for transmission and reception of a D2D device which transmits/receives the D2D communication request signal to/from itself may not count. The resource 410 may be defined as a resource pre-checked by Rx D2D devices and the corresponding Rx D2D device may determine whether to decode the remaining resources 420 after checking the resource 410. For example, when D2D device #a transmits the D2D communication request signal to D2D device #b, D2D device #a can transmit the D2D communication request signal through resources (a,b) and (b,b). All D2D devices which transmit the D2D communication request signal to D2D device #b, other than D2D device #a. can also transmit the D2D communication request signal through the resource (b,b). In this case, the D2D communication request signal may be a signal (a signal orthogonal to the conventional D2D communication request signal or a code spread/hopped signal) different from the conventional D2D communication request signal or may be transmitted with power different from that for the conventional D2D communication request signal.

A resource that needs to be pre-checked by each Rx D2D is preferably the first resource in time order from among resources allocated per Rx D2D device. This structure is shown in FIG. 3. The structure is applied not only to the method for configuring a D2D communication request signal transmission region using the maximum number of D2D devices supportable by the BS but also to the following embodiments.

The following methods can be considered in order to use resources more efficiently than the aforementioned method for configuring a D2D communication request signal transmission region using the maximum number of supported D2D devices.

Embodiment 2: Method for Configuring a D2D Communication Request Signal Transmission/Reception Region Using a Dynamically Varying Number of D2D Devices The number of D2D devices operating in a BS is variable. That is, the number of D2D devices (i.e. D2D devices accessing the BS) which request D2D communication to the BS and perform peer discovery may be variable. Regions for transmitting D2D communication request signals of D2D devices may be configured using the variable number M of D2D devices. Here, the number M of D2D devices is less than or equal to the maximum number K of D2D devices, which is defined when the D2D communication request signal transmission region is configured using the number of D2D devices supportable by the BS. The BS generates and uses a region corresponding to M×M resources for transmission and reception of D2D communication request signals with respect to the M D2D devices. Precisely, the BS may use a region corresponding to M×(M−1) resources except for a resource for a D2D device which transmits/receives the D2D communication request signal thereto/therefrom. Here, M×M resources may be represented differently according to the number of Tx D2D devices and the number of Rx D2D devices.

The number M of D2D devices may be determined through negotiation of D2D capability between D2D devices and the BS during BS access processing of the D2D devices or indicated to the BS. Access processing may be performed in a ranging process or a related process.

Alternatively, the BS may detect the number of D2D devices within the corresponding cell through D2D information received from D2D devices in a predetermined region or at a predetermined time.

For example, the BS can reduce resources reserved for transmission and reception of D2D communication request signals by $2 \times M \times (K-M) + (K-M)^2$ (here, M≤K) by decreasing the number of D2D communication request signal transmission/reception regions, K×K to M×M in the first embodiment. Accordingly, it is possible to improve system performance and frequency efficiency by reducing the quantity of resources that need to be reserved for transmission and reception of signals between D2D devices and using saved resources for transmission of control information or data.

The BS may configure regions for transmission and reception of the D2D communication request signal by dynamically detecting the number of D2D devices at the request of a D2D device (or according to access/registration of a D2D device) or using the number of D2D devices participating in peer discovery. Accordingly, when the number of D2D devices is frequently changed or corrected and signaled to the D2D device, complexity and signaling overhead increase. Therefore, it is possible to prevent the number of D2D devices from frequently changing by setting a resource allocation interval or period for D2D device request (or peer discovery) and signaling the resource allocation interval or period to the D2D device which requests D2D communication. The BS can transmit information about the resource allocation interval or period for D2D device request to the D2D device through higher layer signaling or transmit the information to D2D devices within the corresponding cell through a paging signal or a broadcast channel (e.g. PBCH).

Figure 5:
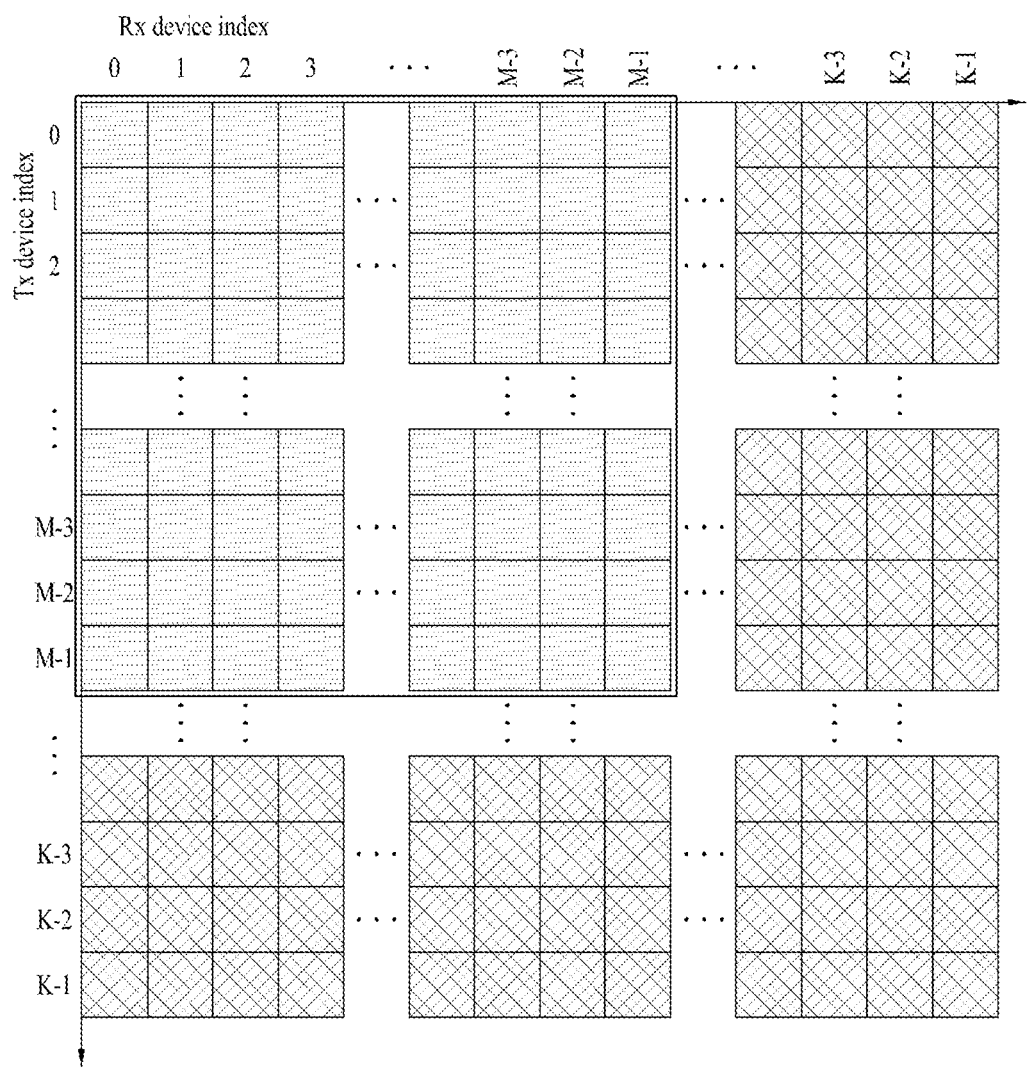
FIG. 5 illustrates an exemplary resource configuration for transmitting a D2D communication request signal for requesting D2D communication according to a second embodiment of the present invention.

FIG. 5 illustrates an exemplary resource configuration for transmitting a D2D communication request signal for requesting D2D communication according to a second embodiment of the present invention.

Referring to FIG. 5, M×M resources may be dynamically allocated all the time according to the second embodiment of the invention. Otherwise, fixed K×K resources may be determined and then M×M resources from among the K×K resources may be allocated for the D2D communication request signal according to a predetermined rule through indication of M and the remaining resources may be used for other purposes.

Embodiment 3: Method for Configuring a D2D Communication Request Signal Transmission/Reception Region on the Basis of the Number of D2D Devices Actually Transmitting D2D Communication Request Signals Since all D2D devices which request D2D communication and participate in peer discovery do not simultaneously transmit D2D communication request signals at a specific time, the BS may detect D2D devices which request D2D communication for actual D2D based transmission and reception from among the D2D devices and then configure regions for transmitting D2D communication request signals. The BS can detect D2D devices which actually attempt to perform D2D communication from among D2D devices within the cell through a process as shown in FIG. 6.

Figure 6:
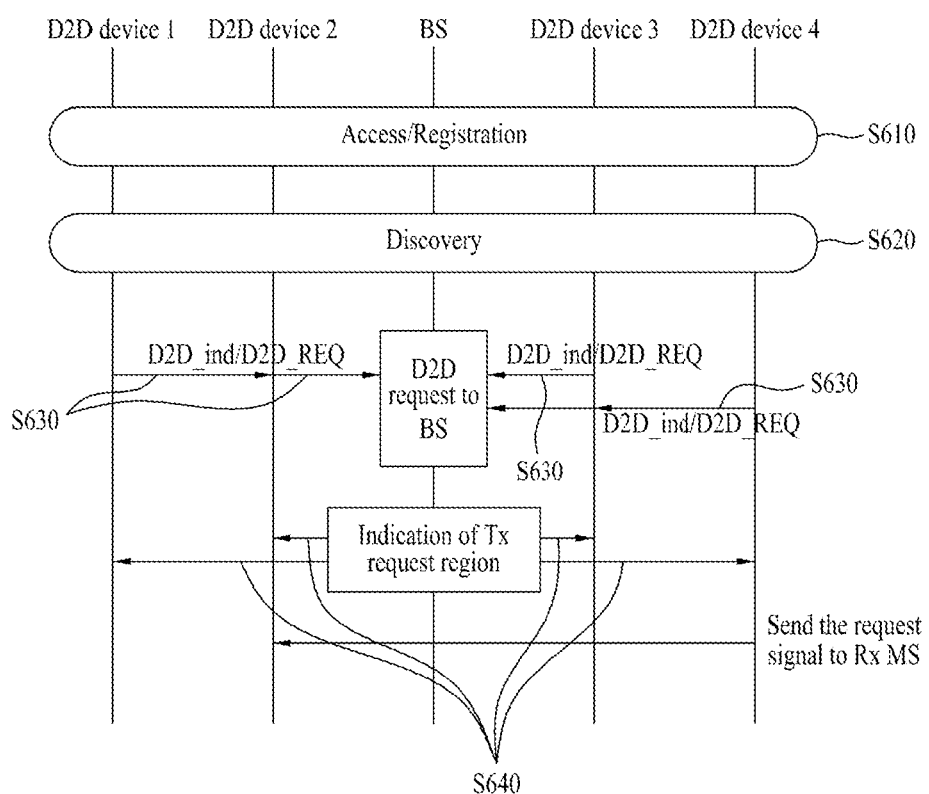
FIG. 6 illustrates an exemplary process for transmitting a D2D communication request signal.

FIG. 6 illustrates an exemplary process for transmitting the D2D communication request signal.

D2D devices (D2D device 1, D2D device 2, D2D device 3 and D2D device 4) within a cell access/register with a BS (S610). Then, each D2D device performs discovery for detecting neighboring D2D devices (S620). Each D2D device which attempts D2D communication with neighboring D2D devices transmits a D2D indication/request signal to the BS (S630). The D2D indication/request signal may include at least one of identification information on a D2D device which requests D2D communication and indication information on a D2D device which desires D2D communication. Otherwise, the D2D indication/request signal may not include the identification information in order to signal only numerals to the BS.

The BS may detect the number N of D2D devices which desire D2D communication with a specific D2D device within the cell by receiving the D2D indication/request signal. Here, the number of D2D devices can be determined by x and y according to the number of Tx D2D devices and the number of Rx D2D devices. Upon detection of the number of D2D devices which desire D2D communication, the BS allocates resources for transmission of D2D communication request signals of the D2D devices and broadcasts information on configuration of the allocated resources to the D2D devices (S640). The information is transmitted to not only the Tx D2D devices but also the Rx D2D devices. Otherwise, the information may be transmitted to all devices or only D2D devices within the cell. The information may include information about the number N of D2D devices which desire D2D communication and information about a mapping rule with respect to N and the identifiers of D2D devices transmitting the D2D communication request signals and D2D devices receiving the D2D communication request signals. The mapping rule with respect to the number N of D2D devices which desire D2D communication and the identifiers of D2D devices which request D2D communication may be implicitly indicated rather than through signaling. The number of D2D devices, detected by the BS, is defined as N and N≤M in general.

The BS can change regions for transmitting and receiving D2D communication request signals on the basis of the number N of D2D device which transmit the D2D indication/request signals. Accordingly, if the D2D devices transmit the D2D indication/request signal at any time, then the BS needs to reconfigure the regions for transmitting and receiving the D2D communication request signals and to signal the regions to the D2D devices whenever the D2D devices transmit the D2D indication/request signal. Thus, the BS needs to frequently change the configuration of the D2D communication request signal transmission/reception regions, generating signaling overhead.

To solve the aforementioned problem, the BS may set an interval or period in which the D2D devices transmit the D2D indication/request signal and transmit information on the interval or period to the D2D devices. The information on the interval or period in which the D2D indication/request signal is transmitted may be broadcast by the BS to the D2D devices within the cell through a broadcast channel or transmitted by the BS to each D2D device through a unicast signal.

When the BS dynamically changes the value N, signaling overhead is generated since the D2D devices need to transmit the D2D indication/request signal such that the BS can estimate N. Accordingly, the BS may set N to a value less than the actual number of peer discovery D2D devices without the process of transmitting the D2D indication/request signal from the D2D devices. The value N may be set through (1) a method of statically/semi-statically/dynamically setting N by the BS and (2) a method of defining N as a function of the number of peer discovery D2D devices and sharing the function related information between the BS and D2D devices.

Figure 7:
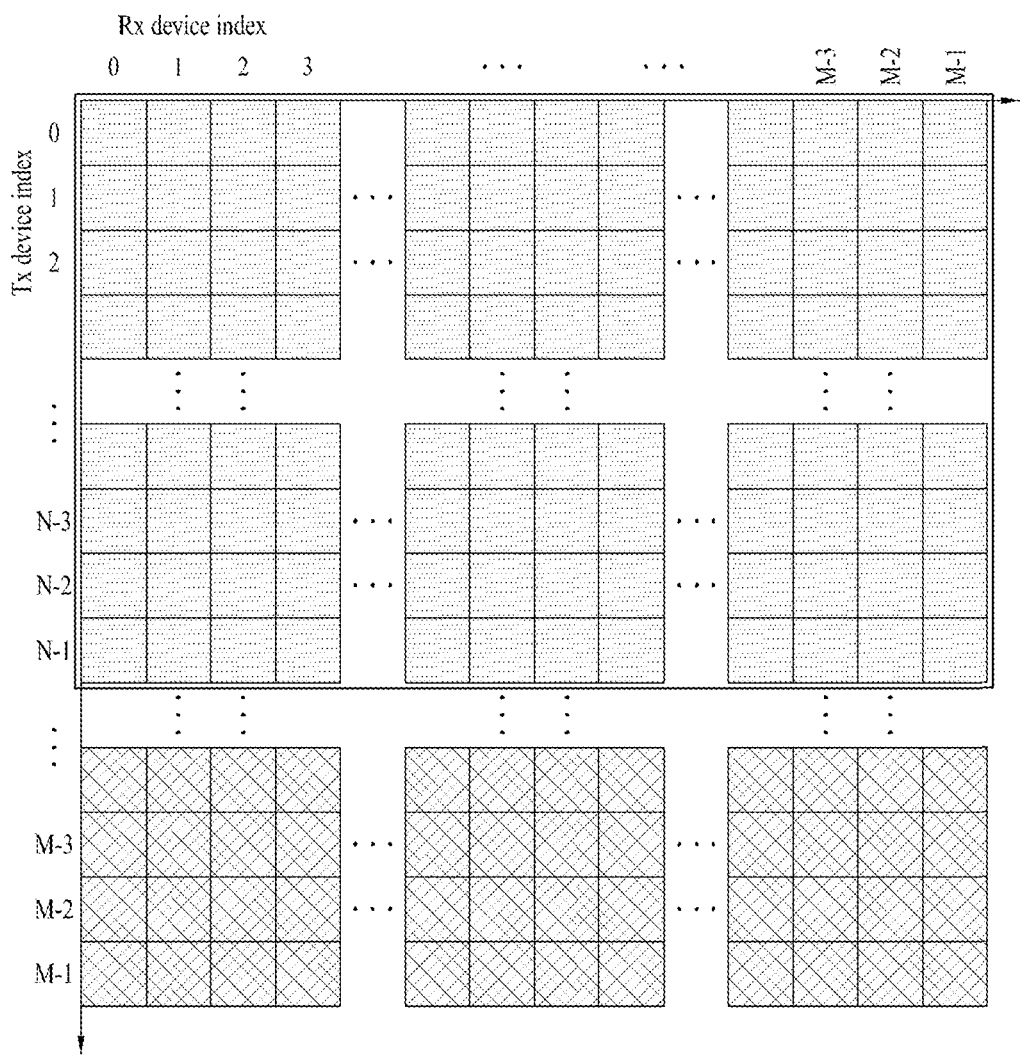
FIG. 7 illustrates an exemplary resource configuration for transmitting a D2D communication request signal for requesting D2D communication according to a third embodiment of the present invention.

FIG. 7 illustrates an exemplary resource configuration for transmitting the D2D communication request signal for requesting D2D communication according to a third embodiment of the present invention.

As shown in FIG. 7, when the number of D2D devices which perform peer discovery for D2D communication is M (M being replaceable by K in the following description) and the number of D2D devices which request D2D communication to the BS, from among the D2D devices, is N, the BS can set N×M or M×N resources for transmitting the D2D communication request signals since the N D2D devices can transmit the D2D communication request signals to one of the M D2D devices.

Accordingly, frequency efficiency and system performance can be improved by using M×(M−N) resources for other purposes, compared to the configuration of FIG. 5 of the second embodiment of the present invention.

Figure 8:
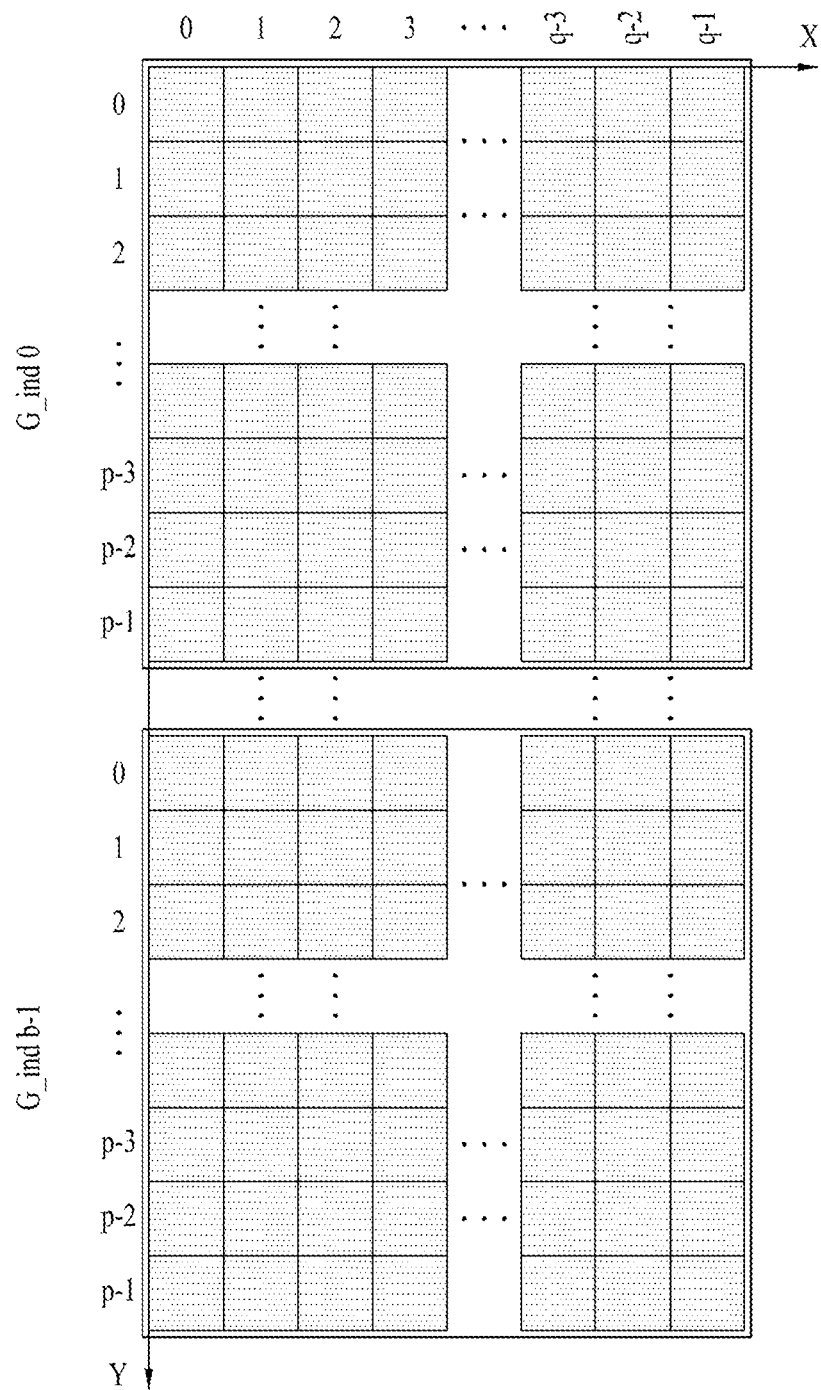
FIG. 8 illustrates an exemplary resource configuration for transmitting a D2D communication request signal for requesting D2D communication according to a fourth embodiment of the present invention.

Embodiment 4: Method for Configuring a Channel or a Resource Per Group Through D2D Device Grouping FIG. 8 illustrates an exemplary resource configuration for transmitting the D2D communication request signal for requesting D2D communication according to a fourth embodiment of the present invention.

The BS groups D2D devices and indicates, to each D2D device, information on a group to which the D2D device belongs. Alternatively, each D2D device may recognize the group corresponding thereto according to a rule of mapping a D2D device ID to a group ID. For example, a group ID may be determined by performing a modulo operation on a D2D device ID (or peer discovery ID) and the number of groups. Here, information on the number of groups may be signaled by the BS. Information about D2D device grouping may be signaled through higher layer signaling, transmitted to D2D devices through a broadcast channel (e.g. a PBCH, a CSS of a PDCCH) or transmitted as a unicast signal to each D2D device through a PDCCH.

In addition, D2D devices forming a group may be D2D devices which access/register with in the BS (or participate in peer discovery), D2D devices which have performed peer discovery or D2D devices which attempt to transmit the D2D communication request signals as in the third embodiment. D2D device grouping may be performed on the basis of strengths of signals received from D2D devices and cell ID, received by the BS. The BS may group D2D devices having similar received signal strengths.

A D2D device group may include a D2D devices and the BS my generate b groups each including a D2D devices. Alternatively, groups may include different numbers of D2D devices.

Accordingly, the BS generates b request transmission channels for transmitting and receiving D2D transmission request signals for transmission of D2D devices belonging to respective groups. As shown in FIG. 8, the request transmission channels are composed of p×q regions. Here, p or q may be related to the number of D2D devices, a, included in the groups and p and q may be mapped in the frequency (or subcarrier) or time (symbol, code or spatial) domain or in a hybrid form corresponding to a combination thereof.

D2D devices belonging to each group may be allocated indices to be discriminated in the group or indices corresponding to the D2D devices may be arbitrarily determined and used as identifiers. Accordingly, grouped D2D devices can transmit the D2D communication request signals through a channel allocated per group using the indices thereof. For example, y-axis index a of the channel is mapped to a D2D device in the group, which transmits the D2D communication request signal, and other D2D devices can receive the D2D communication request signal transmitted from the D2D device by monitoring the channel.

In order to check whether the D2D communication request signal received by a D2D device is destined for the D2D device or other D2D devices, the D2D communication request signal may include a group index G_Idx and a D2D device index Ms_Idx in the corresponding group or D2D device identification information. Accordingly, the D2D communication request signal may include the group index of a D2D device which desires D2D communication and the D2D device index in the group and may be transmitted using a channel element allocated to the corresponding D2D device. To load the information (group index and D2D device index in the group) in the D2D communication request signal, the BS determines q when configuring the channel per group in consideration of the length of the information. The BS may set q to correspond to D2D devices belonging to the same group or D2D devices which are not included in the group. It is necessary to change the mapping relationship between p and q with time such that all D2D devices can check the D2D communication request signal.

A D2D device can transmit the D2D communication request signal for D2D communication through a resource allocated for D2D communication request signal transmission, described in the above embodiments, using the following mapping schemes.

<Case 1: Direct Mapping Using D2D Device ID>

D2D devices are allocated IDs by the BS. Accordingly, the BS can map the IDs allocated to the D2D devices to x-axis and y-axis indices of a resource region for transmitting the D2D communication request signal (sequentially in ascending or descending order of the IDs, for example), include the mapped IDs in information on resource configuration for D2D communication request signal transmission and transmit the information including the mapped IDs to D2D devices or signal mapping information through a unicast signal.

<Case 2: Mapping Using Logical (Virtual) Numbering>

The BS allocates virtual IDs or logical numbers to D2D devices. Here, the virtual IDs or logical numbers allocated by the BS to the D2D devices are mapped to x/y-axis indices of a region allocated for D2D communication request signal transmission of the D2D devices and information on mapping can be transmitted by the BS to the D2D devices along with configuration information on the region. Accordingly, the D2D devices transmit the D2D communication request signals through resources corresponding to the logical numbers/virtual IDs allocated by the BS.

<Case 3: Method Using a Resource Mapping Rule for Discovery>

D2D devices perform discovery for detecting neighboring D2D devices and are allocated configuration information on a discovery region from the BS in order to perform the discovery operation. Here, when the discovery region is composed of separated resources for transmitting discovery signals from D2D devices to other D2D devices, resource mapping for discovery is applicable to resources for D2D communication request signal transmission. That is, a configuration of resources allocated to D2D devices for discovery is equally applied to resources for D2D communication request signal transmission.

The Rx device index and Tx device index indicated on the horizontal axis (x axis) and the vertical axis (y axis) in the preceding figures may be represented by STIDs of D2D devices, C-RNTIs, D2D dedicated IDs, peer discovery IDs set through peer discovery or D2D logical numbers allocated by the BS. The Rx device index and Tx device index may be mapped to subcarriers (or carriers) or symbols corresponding to a region for D2D communication request signal transmission and each index may correspond to a single carrier (or subcarrier)/symbol or multiple carriers (or subcarriers)/symbols. In addition, the x-axis may represent the time domain and the y-axis may represent the frequency domain or vice versa. Furthermore, the x-axis or y-axis may include a code domain or a spatial domain and multiple domains may be connected in a hybrid manner.

Indices corresponding to a resource region allocated for D2D communication request signal transmission may be changed at a predetermined interval/period using a cyclic shift value or a hopping pattern. In this manner, the BS can change the positions of resources for transmitting the D2D communication request signal for D2D devices at a predetermined interval or period so as to reduce the influence of a channel and uniformly maintain D2D communication request signal transmission opportunity.

The BS may set a discovery region for D2D device discovery in the same manner as setting a D2D communication request signal transmission region according to the present invention and transmit information about the discovery region to each D2D device. Accordingly, the BS designates a resource for discovery signal transmission per D2D device and signals the resource to each D2D device. Here, the discovery region signaled by the BS to each D2D device may be configured in the following manner.

Figure 9:
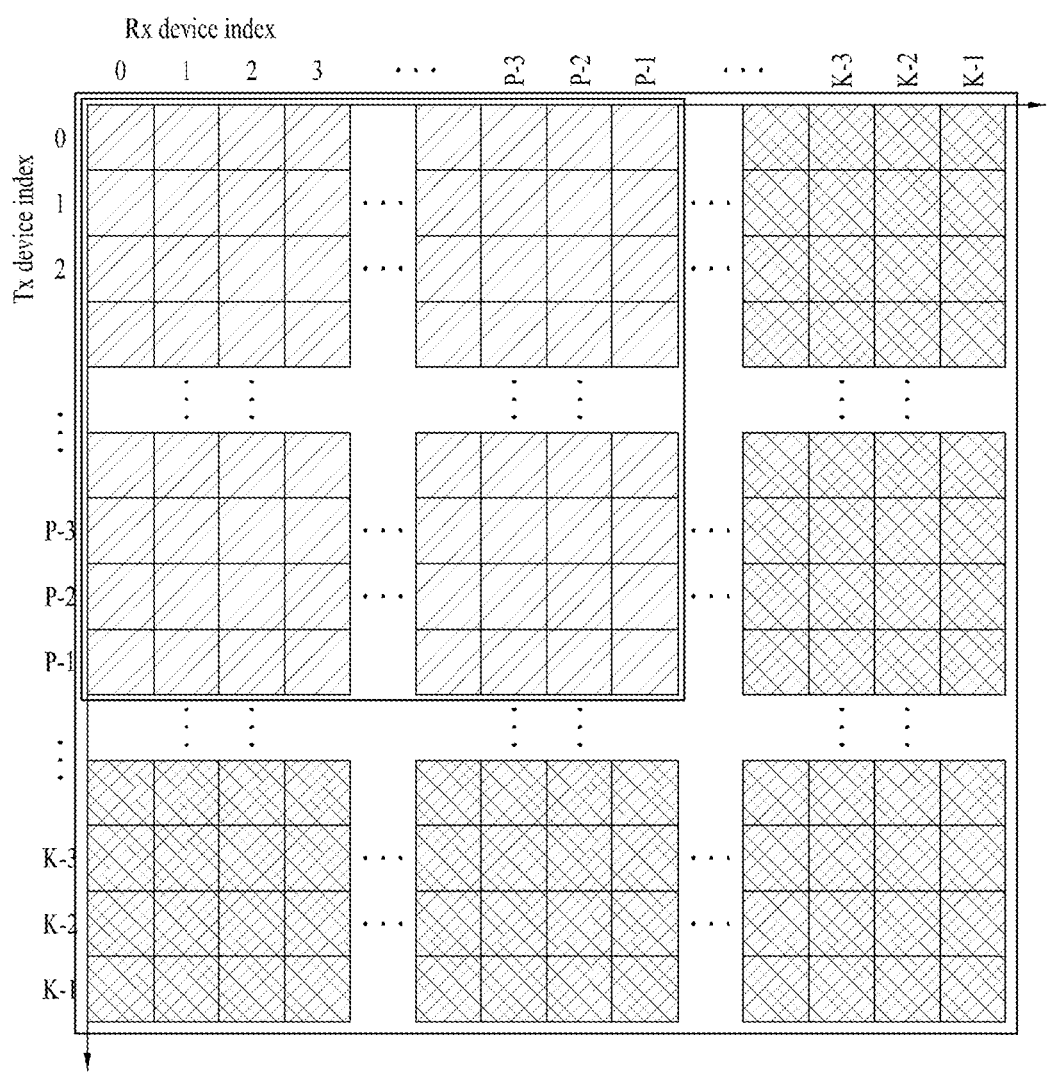
FIG. 9 illustrates an exemplary structure of resources for D2D device discovery on the basis of a maximum number K of D2D devices supported by a BS according to the first embodiment of the present invention.

When the maximum number of D2D devices supportable by the BS is K, as described in the first embodiment, the BS may configure a discovery region for D2D device discovery as shown in FIG. 9.

FIG. 9 illustrates an exemplary structure of resources for D2D device discovery on the basis of the maximum number K of D2D devices supportable by the BS according to the first embodiment of the present invention.

As shown in FIG. 9, in order to allow K D2D devices to transmit/receive discovery signals to/from one another, the BS allocates K×K resources as a discovery region and transmits configuration information (e.g. information on the positions of the allocated resources, the start point (e.g. carrier (subcarrier)/symbol index) of the allocated resources, allocation period information, information on the size of the allocated resources, information on mapping of D2D devices and the allocated resources, etc.) on the discovery region to D2D devices within the corresponding cell through broadcast signaling or higher layer signaling. Here, mapping of the resources corresponding to the discovery region and D2D devices may be performed through the aforementioned method. A D2D device transmits a discovery signal to other D2D devices using the resource set therefor through the mapping information.

For example, when the vertical axis represents Tx D2D device indices, the horizontal axis represents Rx D2D device indices and D2D device #1 is mapped to index #2 of the vertical axis in FIG. 9, D2D device #1 transmits a discovery signal through the region corresponding to index #2 of the vertical axis. Here, Rx D2D device #2 corresponding to index #3 of the horizontal axis can detect neighboring D2D devices by monitoring resources corresponding to the horizontal axis. That is, Rx D2D device #2 can discover D2D device #1 by receiving the discovery signal through the resource corresponding to (2,3) in the region.

The number K of D2D devices, which is used for the BS to configure the discovery region of the D2D devices, may be replaced by the number of D2D devices which access/register with the BS, that is, the number P of D2D devices present in the corresponding cell. Here, P≤K. That is, the number of D2D devices which perform discovery in the coverage of the BS is equal to or less than the maximum number of D2D device supportable by the BS. Here, the number P of D2D devices may be used for the following purposes.

When the BS configures and uses discovery resources in consideration of the number of D2D devices, K, discovery may be performed using only resources corresponding to the number of D2D devices, P, from among the discovery resources. That is, the BS transmits information on the number of D2D devices, P, to the D2D devices within the cell through a broadcast channel (e.g. PBCH, CSS of a PDCCH), a PDCCH or higher layer signaling, to thereby reduce the number of D2D devices which transmit discovery signals. Accordingly, D2D devices use a resource region corresponding to P from among the entire discovery region, and thus a discovery signal detection region or the number of blind decoding operations can be reduced.

Alternatively, the BS newly sets a discovery region for P D2D devices and transmits information on the discovery region to the D2D devices, and the D2D devices perform discovery using a region including P×P resources. In this manner, the BS can set the discovery region for the P D2D devices to prevent resources from being reserved for discovery and wasted, thereby improving resource efficiency.

In the case of FIG. 9, the Tx D2D device index and the Rx D2D device index indicated on the horizontal axis (X-axis) and the vertical axis (Y-axis) may be represented s STIDs, C-RNTIs, D2D dedicated IDs, peer discovery IDs set through peer discovery or D2D logical numbers allocated by the BS with respect to D2D devices, as described above. The indices may be mapped to subcarriers (or carriers) or symbols which constitute a region for D2D communication request signal transmission and each index may correspond to a single carrier (or subcarrier)/symbol or multiple carriers (or multiple subcarriers) symbols. In addition, the x-axis may represent the time domain and the y-axis may represent the frequency domain or vice versa. Furthermore, the x-axis or y-axis may include a code domain or a spatial domain and multiple domains may be connected in a hybrid manner.

Indices corresponding to a resource region allocated for D2D communication request signal transmission may be changed at a predetermined interval/period using a cyclic shift value or a hopping pattern. In this manner, the BS can change the positions of resources for transmitting the D2D communication request signal for D2D devices at a predetermined interval or period so as to reduce the influence of a channel and uniformly maintain D2D communication request signal transmission opportunity.

It is possible to efficiently use resources by efficiently allocating a resource region for discovery signals and D2D communication request signals between D2D devices according to the aforementioned embodiments of the present invention.

A resource region n×n on the basis of the number of D2D devices can be represented as x×y since the number of Tx D2D devices differs from the number of Rx D2D devices.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for allowing a BS to support D2D communication in a wireless communication system and the method for allowing a D2D device to efficiently transmit a D2D communication request signal are industrially applicable to various communication systems such as 3GPP LTE, LTE-A, IEEE 802, etc.

The invention claimed is:
1. A method for receiving a signal by a device-to-device (D2D) device in a wireless communication system, the method comprising:
  receiving, from a base station, information associated with a hopping pattern for a D2D discovery region;
  receiving, from the base station through a higher layer signaling, D2D discovery configuration information;
  wherein the D2D discovery configuration information comprises:
    starting point information of the D2D discovery region in a frequency domain,
    assigned time cycle information of the D2D discovery region, and
    assignment information of the D2D discovery region in a time domain,
  wherein the D2D discovery region is periodically assigned to the D2D device, and
  wherein a time-frequency resource index of the D2D discovery region is periodically changed based on the hopping pattern; and
  detecting a discovery signal of another D2D device on the D2D discovery region in each time cycle based upon the D2D discovery configuration information and the information associated with the hopping pattern for the D2D discovery region.

2. The method according to claim 1, further comprising:
  transmitting a discovery signal through the D2D discovery region based upon the D2D discovery configuration information.

3. A device-to-to device (D2D) device for receiving a signal in a wireless communication system, the D2D device comprising:
  a receiver configured to:
    receive, from a base station, information associated with a hopping pattern for a D2D discovery region; and
    receive, from the base station through a higher layer signaling, D2D discovery configuration information; and
  wherein the D2D discovery configuration information comprises:

starting point information of the D2D discovery region in a frequency domain, assigned time cycle information of the D2D discovery region, and assignment information of the D2D discovery region in a time domain, wherein the D2D discovery region is periodically assigned to the D2D device, and wherein a time-frequency resource index of the D2D discovery region is periodically changed based on the hopping pattern; and a processor configured to detect a discovery signal of another D2D device on the D2D discovery region in each time cycle based upon the D2D discovery configuration information and the information associated with the hopping pattern for the D2D discovery region.

4. The method of claim 1, wherein the D2D discovery region is configured based upon a number of D2D devices.

5. The method of claim 1, further comprising:

receiving information related to a number of D2D devices from the base station; and detecting discovery signals on only a corresponding D2D discovery region within the D2D discovery region based upon the number of D2D devices.

6. The D2D device according to claim 3, wherein the processor is configured to control the transmitter to transmit a discovery signal through the D2D discovery region based upon the D2D discovery configuration information.

7. The D2D device of claim 3, wherein the D2D discovery region is configured based upon a number of D2D devices.

8. The D2D device of claim 3, wherein the receiver is further configured to receive information related to a number of D2D devices from the base station, and wherein the processor is further configured to detect discovery signals on only a corresponding D2D discovery region within the D2D discovery region based upon the number of D2D devices.

* * * * *